United States Patent Office 2,765,357
Patented Oct. 2, 1956

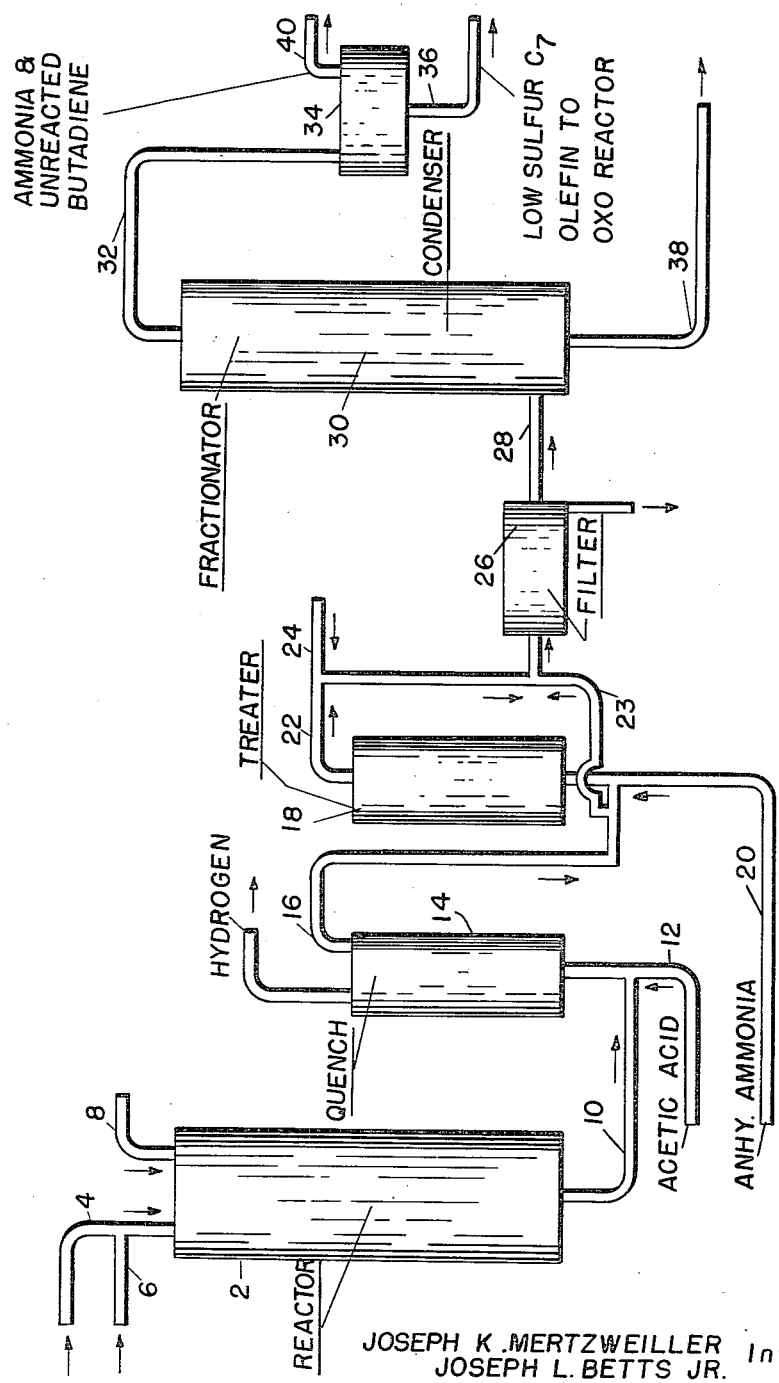

2,765,357

DESULFURIZATION OF OXO FEEDS

Joseph K. Mertzweiller and Joseph L. Betts, Jr., Baton Rouge, La., assignors to Esso Research and Engineering Company, a corporation of Delaware Application December 31, 1952, Serial No. 328,952

3 Claims. (Cl. 260—677)

The present invention relates to the preparation of oxygenated organic compounds from olefins by reaction with CO and $H_2$ in the presence of a carbonylation catalyst. More specifically, the present invention relates to the purification of olefinic feeds to this process to prepare alcohols of high purity which may be utilized as intermediates in the preparation of colorless plasticizing agents. Still more specifically, the present invention relates to the removal of traces of sulfur from the olefinic feed to the carbonylation process.

The synthesis of aldehydes and alcohols from olefinic compounds and mixtures of $H_2$ and CO in the presence of a group VIII catalyst, particularly cobalt, is now well known. In the first stage the olefinic material, $H_2$ and CO are reacted at about 250° to 400° F., and 1500 to 4500 p. s. i. to yield a product consisting essentially of aldehydes containing one more carbon atom than the reacted olefin. This oxygenated mixture which contains in solution salts, complexes and carbonyls of cobalt, is treated thermally in a second stage to cause removal of soluble metal compounds from the aldehyde product. The catalyst-free material is thereafter hydrogenated to the corresponding alcohol.

This carbonylation reaction provides a particularly attractive method for preparing valuable primary alcohols otherwise obtainable only with difficulty; and amenable to the reaction are substantially all organic compounds having olefinic linkages. Of particular interest are olefins having from 4 to 20 carbon atoms, for the corresponding primary alcohols are widely used in commerce and are difficult to obtain otherwise.

The overall carbonylation, or Oxo process, provides at present a particularly effective route for the preparation of primary alcohols for use as intermediates in the production of esters suitable for plasticizers. These plasticizing agents are prepared by reaction of primary alcohols with acids, in particular the dibasic acids such as phthalic, maleic, and adipic, to form the corresponding diester. In particular, the $C_7$-$C_9$ alcohols prepared from readily available petroleum refinery streams, are preferred for forming esters to be used in the plasticizing of light-colored, colorless, and clear plastics.

Serious difficulties have been encountered in the past in the course of the preparation of these esters from alcohols prepared in the manner outlined. The esters are commercially prepared by a technique employing an excess of the alcohol and continuously recycling unreacted alcohol to the esterification zone. It has been observed that the recycle alcohol assumes a continuously increasing darker color, which builds up in the course of esterification, and which makes this alcohol completely unsuitable for esterification purposes. Extensive experimental work has shown that the color forming tendency of the recycle alcohol is related to and caused by small amounts of sulfur in the alcohol product. The sulfur, present in amounts as small as 10 parts per million or 0.001%, causes condensation reactions and the color forming bodies to occur in the ester product. To have a high grade alcohol product adequately meeting all specifications, sulfur content should be reduced to about 5 parts per million.

It has in the past been a difficult process to remove the sulfur present in the carbonylation alcohol either directly from the latter, or from the olefin feed stream to the carbonylation process. Though these streams may be caustic scrubbed, the latter treatment is adequate only to remove a portion of acidic forms of sulfur, such as the lower mercaptans. Furthermore, though it is not difficult to decrease the sulfur content of a hydrocarbon stream from 0.1% to, say 0.01%, the removal of the last traces of sulfur has been found to be an exceptionally difficult and expensive operation. The most readily available feed stocks for the carbonylation reaction are selected hydrocarbon streams derived from petroleum refinery sources, and these usually have sulfur contents of 0.1% and higher. Redistillation of olefins as well as caustic scrubbing of the olefinic feed to the carbonylation zone has proved inadequate and in the past, the most effective measure has been the careful selection of feed stocks for low sulfur content, which has severely limited the availability of suitable feed stock for the process.

It is the principal object of the present invention to disclose a novel method of desulfurizing substantially completely olefinic feeds for the carbonylation process, which untreated feeds have themselves relatively low sulfur content.

It is also a purpose of the present invention to describe an integrated process for preparing a high polymer and the plasticizing agent therefor.

Other and further objects and advantages of the present invention will appear hereinafter.

It has now been found that sulfur may be substantially completely removed from an olefinic hydrocarbon when the latter is employed as the reaction medium for a reacting polymerization system catalyzed by sodium or other alkali metals. In a preferred embodiment of the invention, the polymerization system prepares the high polymer which is to be plasticized by the ester prepared from the alcohol which in turn is prepared from the desulfurized olefins via the alcohol synthesis reaction previously described.

Polymerization reactions catalyzed by finely-divided sodium or other alkali metals in the presence of diluents to form high polymers and plastics are well known in the art. The diluent upon completion of reaction preparing the high polymer may be recovered by stripping for further use in the carbonylation reaction to prepare alcohols, and the resulting alcohols used to prepare esters suitable for plasticization. The plasticizer is used as such together with the high polymer, recovered as bottoms from the above stripping. It is also known in the art that incorporation of plasticizers into high polymers improves processability such as mill behavior and extrusion performance and produces desirable properties in finished articles such as flexibility and low temperature performance.

It has been found that when an olefin is employed as a reaction medium in a polymerization system wherein butadiene is copolymerized with styrene in the presence of a sodium catalyst, substantially complete desulfurization of the olefin is obtained, without the diluent olefin participating in the reaction.

In accordance with the present invention, therefore, olefin to be subsequently converted to aldehyde and alcohol is employed as a liquid medium and diluent in a polymerization reaction at mild conditions catalyzed by metallic sodium, at a temperature less than 175° F. As pointed out below, it is essential that the treatment take place in the presence of a reacting polymerization system. The treatment of the diluent without any one of the essential reactants of the polymerization system is completely ineffective, thus showing that it is not the mere treatment with the sodium that effects the desulfurization.

Operating in accordance with the process of the present invention has been found to be particularly effective in a sodium-catalyzed polymerization process wherein butadiene and styrene are copolymerized in the presence of 200 to 300 parts of a sulfur-contaminated olefinic hydrocarbon diluent at 100° to 150° F. A hydrocarbon having sulfur content of 17 parts per million was reduced to one having 4 parts per million, which is a substantial improvement.

The present invention and its application will best be understood from the more detailed description hereinafter, wherein reference will be made to the accompanying drawing showing one embodiment of the present invention. Though the embodiment in the drawing shows the polymerizing of butadiene and styrene, it is to be understood that the invention is not restricted thereto, but contemplates within its scope other polymerization systems catalyzed by sodium or other alkali metal. Similarly, it is to be understood that the invention may be applied to desulfurizing other organic liquids than feeds for the aldehyde synthesis reaction. Thus, it may be readily applied to the desulfurizing naphtha or in gasoline fractions to produce low sulfur liquid fuels.

Turning now to the drawing, a stream of butadiene and styrene and a minor proportion of isopropanol is passed into reactor 2 through line 4. The proportions of the ingredients are determined by the nature of the polymer desired; for a good drying oil the proportions may be about 80 parts diene to 20 parts styrene, and 0.3 part isopropyl alcohol. A stream of the hydrocarbon to be desulfurized is admitted through the line 4 into reactor 2, in amounts of about 200 to 300 parts by weight. Catalyst, which is about 2 parts by weight of sodium dispersed in the olefin to be desulfurized, i. e. C7 olefin, is admitted through line 8.

Reactor 2 is provided with mechanical stirring means, and is maintained at a temperature of from about 100° to 160° F. and a pressure of about 30 to 40 p. s. i. g. (It may be desirable to add a quantity of modifier such as dioxane, diethyl ether, diisopropyl ether, and the like, to insure smoothness of the reaction.) The reaction proceeds for a period of about 4 to 30 hours, it being customary to increase the temperature to the upper limit in the latter part of the reaction.

When the reaction is substantially complete, the total product is withdrawn through line 10 and the reaction is quenched in vessel 14 by acetic acid added through line 12. The temperature in quenching zone 14 is about 130° F. The quenched product is thereafter passed through line 16 into treater 18, wherein excess acetic acid is neutralized with anhydrous ammonia admitted through line 20. This neutralization step, however, may in a once-through operation, be omitted, and the product from 14 be directly passed to a filtration zone 26 through line 23. Filter aid is advantageously added, and the total product freed from solidified materials in filter 26.

Clarified solution of the polymer in solvent olefin is passed to fractionation vessel 30 via line 28. Vessel 30 may be operated at atmospheric or subatmospheric pressures. Overhead is withdrawn a stream consisting essentially of the olefin solvent, now substantially completely freed of sulfur, and also unreacted butadiene and ammonia. The polymer is withdrawn as a bottoms product through line 38 for further processing. The overhead from tower 30 is passed into condenser 34, where olefin diluent condenses as a liquid, while the unreacted and gaseous NH3 and butadiene pass overhead through line 40 for recycle to the process.

The olefin product is withdrawn from the lower portion of condenser 34 through line 36 and is passed to the carbonylation zone wherein it is converted to aldehyde and thereafter to alcohol and ester in a manner known per se.

The process of the present invention may be further illustrated in the following example, wherein a heptene fraction prepared by copolymerizing butenes and propylene, and containing 17 parts per million of sulfur, was employed as a reaction solvent for the sodium catalyzed polymerization of butadiene and styrene.

|  | A | B | C | D | E | F |
|---|---|---|---|---|---|---|
| Synthesis Charge, Wt. Percent: a |  |  |  |  |  |  |
| Diluent— |  |  |  |  |  |  |
| Close cut naphtha | 250 | 250 |  |  |  |  |
| C7 Olefin b |  |  | 100 | 250 | 240 | 250 |
| Dioxane | 30 |  |  | 30 | 30 |  |
| Isopropyl alcohol (99%) | 0.3 | 0.3 | 0.3 | 0.3 | 0.3 | 0.3 |
| Sodium c | 2.0 | 2.0 | 2.0 | 2.0 | 2.0 | 2.0 |
| Butadiene | 80 | 80 |  | 80 | 100 | 80 |
| Styrene | 20 | 20 |  | 20 |  | 20 |
| Reaction: d Conversion, Percent | 100 | 100 | Trace | 56 | 64 | 91 |
| Product: e Viscosity, poises @ 50% dil | 1.0 | 0.8 |  | 0.4 | 0.5 | 0.5 |
| Distillate: e Sulfur, p. p. m., original C7 olefin, 17 |  |  | 14 | 12 | 16 | 4 | a Order of charging.
b Sulfur content of original C7 olefin fraction was 17 p. p. m.
c Sodium added as a 15 wt. percent dispersion in Varsol.
d Temperature during synthesis: 3 hours at 126° F., 2 hours at 130° F., remainder at 130-160° F.
e Products from synthesis filtered then stripped to 300° F. (liquid) at 27″ (Hg) vacuum. Residue diluted 1 to 50% NVM with Varsol for evaluation. Distillate from stripping analyzed for sulfur.

These data indicate the following:

(1) Little or no desulfurization or polymerization results when C7 olefin is treated with sodium in the absence of polymerizable monomers (run C).

(2) Polymerization results, but little or no desulfurization is achieved in the absence of styrene (run E) or in the presence of dioxane as a modifier (runs D and E).

(3) In the presence of styrene and in the absence of dioxane good desulfurization is obtained under the comparatively mild conditions indicated in run F. These conditions, along with the above described characteristics are indicative of a new and novel desulfurization process.

Various modifications not specifically described herein, an application to a continuous process for example, may become apparent to those skilled in the art without departing from the scope of the present invention.

What is claimed is:

1. An improved process for purifying hydrocarbon streams contaminated with minor amounts of sulfur-containing compounds which comprises passing said stream into a polymerization zone, passing into said zone butadiene and styrene and an alkali metal catalyst, substantially copolymerizing said butadiene and styrene in said zone to form a high molecular weight polymer and to effect a reduction of the sulfur content to less than about 10 p. p. m., maintaining polymerization temperatures in said zone not higher than about 175° F. and withdrawing from said zone said first-named hydrocarbon material substantially free from sulfur.

2. The process of claim 1 wherein said sulfur contaminated material is an olefin.

3. The process of claim 2 wherein said olefin is a heptene fraction.

References Cited in the file of this patent
UNITED STATES PATENTS

| 2,355,392 | Oberfell | Aug. 8, 1944 |
| 2,398,930 | Gary | Apr. 23, 1946 |
| 2,413,254 | Soday | Dec. 24, 1946 |
| 2,558,137 | Hepp | June 26, 1951 |
| 2,570,032 | Heinrich | Oct. 2, 1951 |
| 2,595,786 | Hale et al. | May 6, 1952 |
| 2,631,175 | Crouch | Mar. 10, 1953 |